J. G. HESS.
Faucet.

No. 218,739. Patented Aug. 19, 1879.

WITNESSES:
Henry N. Miller
C. Sedgwick

INVENTOR:
J. G. Hess
BY Munn & Co
ATTORNEYS.

UNITED STATES PATENT OFFICE.

JOHN G. HESS, OF GUTTENBURG, NEW JERSEY.

IMPROVEMENT IN FAUCETS.

Specification forming part of Letters Patent No. 218,739, dated August 19, 1879; application filed April 19, 1879.

*To all whom it may concern:*

Be it known that I, JOHN G. HESS, of Guttenburg, in the county of Hudson and State of New Jersey, have invented a new and Improved Spigot or Faucet, of which the following is a specification.

My invention relates to spigots or faucets for drawing liquids from barrels, and has for its object to render the plug tight in the tube to prevent leakage and prevent wear upon the plug.

The invention consists in a packing-ring of elastic material contained in an annular recess in the spigot around the plug, the aperture of which packing-ring is concentric with the axis of the plug, so that the plug is packed tightly, and there is but slight wear upon the plug and packing when in use.

Figure 1:
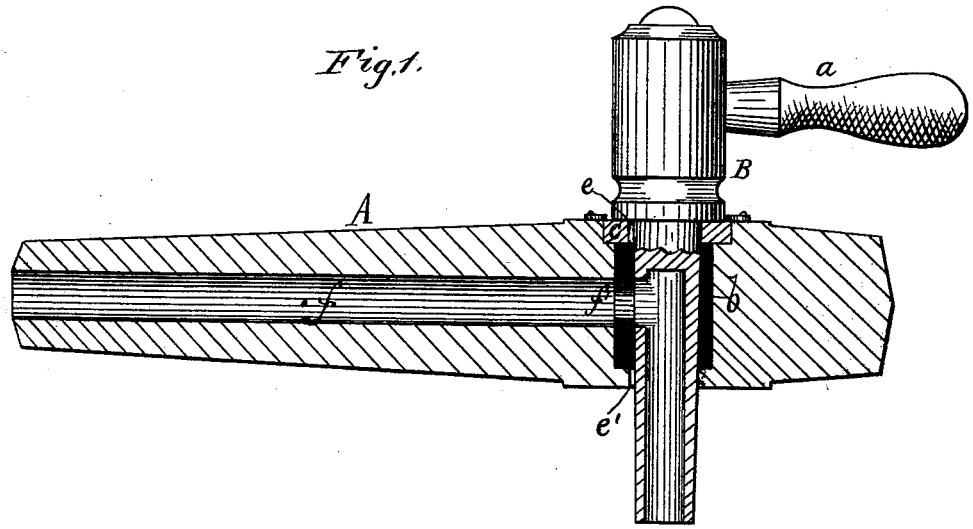
Figure 2:
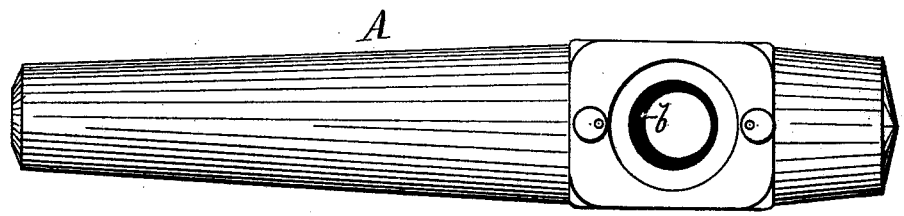

In the accompanying drawings, Figure 1 is a vertical longitudinal section of my improved spigot. Fig. 2 is a top view with the plug removed.

Similar letters of reference indicate corresponding parts.

A is the tapering tube of the spigot for insertion in the barrel, cored at $f$, as usual, and B is the hollow plug that passes crosswise through the tube A, and is provided with a handle, $a$, for turning it, to open and close the passages at the inside.

The upper end of plug B is enlarged to form a shoulder that rests upon the tube, and the smaller part of the plug is slightly tapering, and passes freely through the apertures $e\ e'$ of the tube. The aperture in the tube is enlarged at the inner part to form an annular space around the plug, in which is the packing-ring $b$, of rubber or other elastic material, and, for convenience of inserting the packing, the aperture $e$, through which the plug passes at the upper side, is cut in a separate ring-shaped piece, $c$, that is inserted in a similar-shaped recess and retained by suitable devices. This ring $c$ covers the packing.

The central aperture of the packing-ring $b$ is eccentric to the apertures $e\ e'$ of the tube, and is of about the same diameter as these apertures $e\ e'$, which has the effect to render the packing thicker at one side and to pack the plug tightly at that side, while the opposite side of the plug is pressed in contact with the sides of apertures $e\ e'$.

The thicker side of the packing is toward the core $f$ of the tube, and is apertured at $f'$ to coincide with $f$.

It will be seen that the spigot is packed tightly adjacent to the opening $f\ f'$ whichever way the plug B is turned, and the plug B, bearing against the sides of the apertures $e\ e'$, is firmly sustained.

There will be but slight wear either upon the plug or the packing, and the packing will compensate for wear on the plug. The spigot is preferably made of wood.

The described construction furnishes a spigot much superior to the ordinary wooden spigot, wherein the plug is packed by wedge-action of the wooden surfaces.

The same effect will be produced by placing the packing-ring in a recess eccentric to the axis of the plug instead of forming the ring with an eccentric aperture.

I am aware that an elastic packing is not, broadly, new; but

What I claim, and desire to secure by Letters Patent, is—

In combination with the cored tube A, provided with the aperture $e$, having an annular space or recess formed around its inner part, and the hollow plug B, the soft-rubber packing-ring $b$, having an eccentric aperture, and arranged in the said annular recess of the aperture of the tube with its thicker side toward the core of the said tube, substantially as and for the purpose set forth.

JOHN G. HESS.

Witnesses:
C. SEDGWICK,
GEO. D. WALKER.